United States Patent
Wallén et al.

(10) Patent No.: US 9,629,098 B2
(45) Date of Patent: Apr. 18, 2017

(54) METHODS AND NODES FOR CONTROLLING UPLINK POWER IN A RADIO NETWORK

(71) Applicant: Telefonaktiebolaget L M Ericsson (publ), Stockholm (SE)

(72) Inventors: Anders Wallén, Ystad (SE); Christian Bergljung, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/782,966

(22) PCT Filed: Mar. 11, 2014

(86) PCT No.: PCT/SE2014/050295
§ 371 (c)(1),
(2) Date: Oct. 7, 2015

(87) PCT Pub. No.: WO2014/168550
PCT Pub. Date: Oct. 16, 2014

(65) Prior Publication Data
US 2016/0073353 A1 Mar. 10, 2016

Related U.S. Application Data (60) Provisional application No. 61/809,547, filed on Apr. 8, 2013.

(51) Int. Cl.
*H04B 7/00* (2006.01)
*H04W 52/14* (2009.01)
(Continued)

(52) U.S. Cl.
CPC ....... *H04W 52/146* (2013.01); *H04W 52/243* (2013.01); *H04W 52/288* (2013.01); *H04W 52/367* (2013.01)

(58) Field of Classification Search
CPC . H04W 72/082; H04W 52/367; H04W 52/04; H04W 52/243; H04W 24/00;
(Continued)

(56) References Cited

U.S. PATENT DOCUMENTS

| | | | |
|---|---|---|---|
| 2011/0164514 A1 | 7/2011 | Afkhamie et al. | |
| 2011/0230225 A1* | 9/2011 | Yokoyama | H04W 52/26 455/522 |

FOREIGN PATENT DOCUMENTS

| | | |
|---|---|---|
| WO | 2009149023 A1 | 12/2009 |
| WO | 2012122116 A1 | 9/2012 |
| WO | 2012177218 A2 | 12/2012 |

OTHER PUBLICATIONS

3GPP, "3rd Generation Partnership Project; Technical Specification Group Radio Access Network; Radio Resource Control (RRC); Protocol specification (Release 12)", 3GPP TS 25.331 V12.5.0, Mar. 2015, 1-2225.

(Continued)

*Primary Examiner* — Keith Ferguson
(74) *Attorney, Agent, or Firm* — Murphy, Bilak & Homiller, PLLC (57) ABSTRACT

A method and network node (800) for controlling power of uplink transmissions from a user node (802) when switching between a first operating mode and a second operating mode. The network node (800) signals to the user node (802) a first value of a maximum allowed transmit power to be applied when operating in the first operating mode and a second value of the maximum allowed transmit power to be applied when operating in the second operating mode. The user node (802) then uses a transmit power not exceeding the first value when transmitting radio signals in the first operating mode, and uses a transmit power not exceeding the second value when transmitting radio signals in the second operating mode. Thereby, the user node (802) itself regulates (Continued)

the transmit power depending on operating mode without requiring further signalling from the network node (800).

41 Claims, 4 Drawing Sheets

(51) Int. Cl.
*H04W 52/24* (2009.01)
*H04W 52/28* (2009.01)
*H04W 52/36* (2009.01)

(58) Field of Classification Search
CPC . H04W 52/34; H04W 72/02; H04W 72/0453;
H04W 52/146
USPC .......... 455/522, 69, 68, 67.11, 552.1, 553.1,
455/550.1, 507, 508, 450, 422.1, 500,
455/517, 403, 423–425, 445, 127.1,
455/127.2, 127.3, 127.4; 370/328, 329,
370/343, 338, 310, 318
See application file for complete search history.

(56) References Cited

OTHER PUBLICATIONS

3GPP, "3rd Generation Partnership Project; Technical Specification Group Radio Access Network; Radio Resource Control (RRC); Protocol specification (Release 11)", 3GPP TS 25.331 V11.5.0, Mar. 2013, 1-2079.

\* cited by examiner

METHODS AND NODES FOR CONTROLLING UPLINK POWER IN A RADIO NETWORK

TECHNICAL FIELD

The present disclosure relates generally to a network node, a user node and methods therein, for controlling uplink transmission power for the user node when switching between different operation modes.

BACKGROUND

In traditional radio networks for wireless communication, such as GSM networks, a single narrowband frequency carrier is typically used for transferring data and messages in radio signals between the network and a user node connected to a radio access node of the network, usually called network node or base station, either for transmitting signals from the network node on a downlink connection to the user node or for transmitting signals from the user node on an uplink connection to the network node. Recently, increasingly advanced user terminals and devices have emerged on the market, e.g. smartphones, tablets and wireless laptops, which are suitable for services such as internet browsing, streaming of media and any other communication of large amounts of data. The demands for high data throughput has therefore increased.

In this description, the term "user node" is used to represent any communication equipment capable of transmitting radio signals to a radio access node of a radio network, such as a base station. The user node in this context could also be referred to as a mobile terminal, mobile station, User Equipment (UE), wireless device, etc., depending on the terminology used. Further, the term "network node" will be used to represent a node of a radio network, that is configured to signal information to a user node.

To meet the greater demands for data throughput, the possibility of using two or more carriers in parallel in a user node has been introduced such that the amount of data that can be communicated per time unit, also referred to as data throughput, is basically multiplied by the number of carriers used. This feature thus introduces multiple parallel carriers transmitted on separate frequencies to or from the same user node, provided that the user node is capable of using multi-carriers. The user node may also employ multiple antennas for transmitting on multiple carriers. Further, the user node may need to switch between two different operating modes such as transmitting on a single carrier or on two or more carriers, basically depending on availability of radio resources and/or the need for data throughput.

Figure 1:
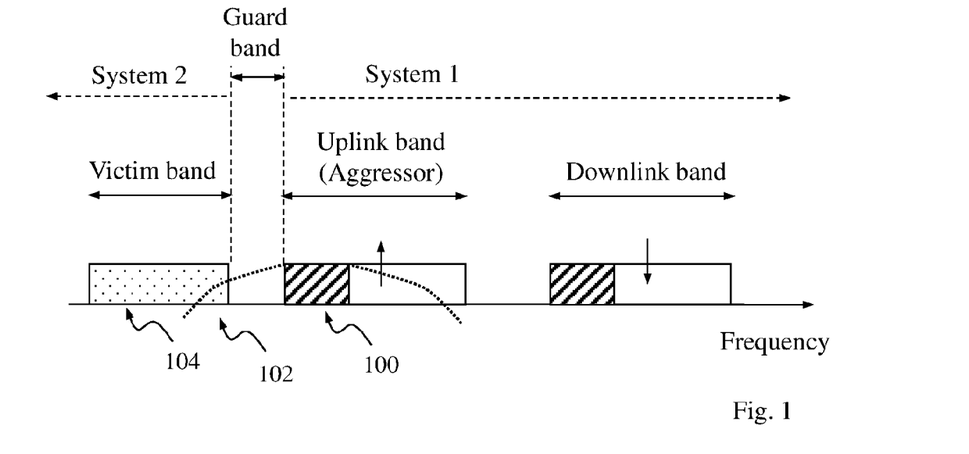
FIG. 1 is a diagram illustrating how uplink transmissions in one system band may cause interference in another system band.

Uplink transmissions from a first user node which occur within a first system band may cause interference to one or more other nodes receiving radio signals within a neighboring second system band since the first user node's transmission also causes unwanted emissions outside its own nominal transmission band, also referred to as "out-of-band" or "spurious" emissions. For example, the first and second system bands may be used by different network operators having adjacent licensed frequency bands, or by different cells of a radio network. An example situation is illustrated in FIG. 1 where a first network system 1 is configured to use a system band for uplink transmissions and a second network system 2 is configured to use a neighboring system band for either downlink or uplink transmissions or both.

Even though the uplink band of system 1 and the band used by system 2 are separated by a certain guard band in the example shown in the figure, transmission from the first user node in the uplink band of system 1, denoted "aggressor", may still cause interference to a second node receiving in the neighboring band 104 of system 2, denoted "victim band". The unwanted emissions on both sides of the nominal uplink band 100 are schematically indicated by dotted curves outside the band 100, and a part 102 of the nominal victim band 104 of system 2 coincides with the emissions from the first user node, thus resulting in interference at the second node, particularly if the first and second nodes happen to be located relatively close to one another.

For example, the victim band 104 may be used for downlink transmissions and the second node may therefore be a user node. A similar interference from uplink emissions may also occur when the victim band is also used for uplink transmissions where the second node is a network node. Another example is when the victim band 104 is used for Time Division Duplex, TDD, transmissions alternately switching between downlink and uplink timeslots according to a TDD scheme. Further examples include when the victim band 104 is used for other wireless services such as public safety, military communication, radar, and so forth.

It is thus a problem that uplink transmissions in a nominal band may cause interference in another adjacent victim band due to unwanted out-of-band emissions that partly coincide with the adjacent victim band. A conventional solution to avoid or at least reduce the above interference is to employ power regulation such that the transmitting user node is instructed by its serving network node to reduce its transmission power. This may be implemented by sending or otherwise providing a maximum allowed transmit power to the user node, thereby instruction the user node to use a transmit power not exceeding the maximum allowed transmit power. This maximum allowed transmit power may also be preconfigured, e.g., in a standard specification or the like. However, if the user node frequently switches between different operating modes, the network node may need to send a new power regulation order each time the user node has switched its operating mode.

It is thus another problem that if a user node switches between different operating modes, the serving network node may need to send frequent power regulation orders to the user node which occupy precious radio resources, and it also takes some time before the user node has received an order and adjusted its transmit power accordingly. Therefore, the user node may still generate the above-described unwanted emissions that may cause interference in an adjacent band, at least for a limited time period before adopting to the power regulation order, each time it has changed its operating mode which may be done repeatedly and very rapidly, e.g. depending on the current need for data throughput and available radio resources.

SUMMARY

It is an object of embodiments described herein to address at least some of the problems and issues outlined above. It is possible to achieve this object and others by using a user node, a network node and methods therein as defined in the attached independent claims.

According to one aspect, a method is performed by a network node of a radio network, for controlling power of uplink transmissions from a user node configured to switch between a first operating mode and a second operating mode when transmitting radio signals. In this method, the network node signals to the user node a first value of a maximum allowed transmit power to be applied by the user node when operating in the first operating mode and a second value of the maximum allowed transmit power to be applied by the user node when operating in the second operating mode. Thereby, the network node requires the user node to use a transmit power not exceeding the first value when transmitting radio signals in the first operating mode, and to use a transmit power not exceeding the second value when transmitting radio signals in the second operating mode.

According to another aspect, a network node of a radio network is arranged to control power of uplink transmissions from a user node capable of transmitting radio signals in a first operating mode and in a second operating mode. The network node comprises means configured to signal to the user node a first value of a maximum allowed transmit power to be applied by the user node when operating in the first operating mode and a second value of the maximum allowed transmit power to be applied by the user node when operating in the second operating mode. Thereby, the network node is operable to require the user node to use a transmit power not exceeding the first value when transmitting radio signals in the first operating mode, and to use a transmit power not exceeding the second value when transmitting radio signals in the second operating mode.

According to another aspect, a method is performed by a user node for performing uplink transmissions as controlled by a network node of a radio network, the user node being capable of transmitting radio signals in a first operating mode and in a second operating mode. In this method, the user node receives from the network node a first value of a maximum allowed transmit power to be used when operating in the first operating mode and a second value of the maximum allowed transmit power to be used when operating in the second operating mode. The user node further uses a transmit power not exceeding the first value when transmitting radio signals in the first operating mode, and also uses a transmit power not exceeding the second value when transmitting radio signals in the second operating mode.

According to another aspect, a user node is arranged to perform uplink transmissions as controlled by a network node of a radio network, the user node being capable of transmitting radio signals in a first operating mode and in a second operating mode. The user node comprises means configured to receive from the network node a first value of a maximum allowed transmit power to be used when operating in the first operating mode and a second value of the maximum allowed transmit power to be used when operating in the second operating mode. The user node also comprises means configured to use a transmit power not exceeding the first value when transmitting radio signals in the first operating mode, and to use a transmit power not exceeding the second value when transmitting radio signals in the second operating mode.

Advantages that may be achieved when employing any of the above aspects include, without limitation, a reduced risk for interference caused by the user node when switching between the two operating modes, which will be explained in more detail below.

The above methods and nodes may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided which can be used to avoid or at least reduce the risk for interference caused by a user node when switching between two operating modes that generate different amounts of unwanted emissions outside a nominal uplink band or frequency range, which emissions may coincide with another band or frequency range that may be used by a victim system, or by another communication entity or by another service, or similar.

Unwanted emissions immediately outside a used nominal band or frequency range are typically generated from the modulation process and non-linearity in the transmitter in the user node, whereas emission further away in frequency, i.e. spurious emissions, are typically caused by unwanted transmitter effects such as harmonics emission, parasitic emission, intermodulation products and frequency conversion products. These effects are typically reduced when the output power of the transmitter is reduced. Moreover, the wider the aggressor channel bandwidth, the wider the unwanted spectral emissions.

The increased demand for mobile services in a radio network has increased the need for allocation of additional spectrum for mobile services. This also means that the frequency separation between operating bands designated for mobile services and bands intended for other services will be reduced such that the risk of harmful interference between services increase. Embodiments described in this disclosure may be used for reducing such harmful interference caused by the unwanted emissions outside the nominal band. It should be noted that the described embodiments may be useful regardless of whether the unwanted emission is categorized as out-of-band or spurious. For simplicity, the term "out-of-band" is used in this description without limitation. The solution may be used e.g. to meet certain spurious emission requirements being enforced on transmissions in a nominal band or frequency range, for whatever reason.

It is thus recognized that more or less out-of-band emissions are generated depending on the operating mode used, such as single carrier transmission versus multiple carrier transmission, or single antenna transmission versus multiple antenna transmission. In general, multiple carrier transmission and/or multiple antenna transmission potentially generate more out-of-band emissions than single carrier transmission and/or single antenna transmission, which will be explained in more detail below. The used operating mode may further involve different features such as different modulation schemes, antenna configurations, uplink Multiple-Input-Multiple-Output, MIMO, and uplink transmit diversity, to mention a few non-limiting examples which may generate different amounts of out-of-band emissions.

Figure 2A:
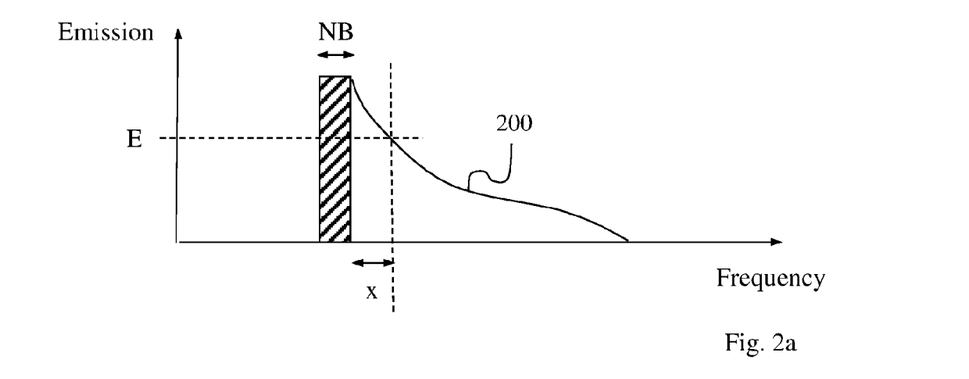
FIG. 2a and FIG. 2b are diagrams illustrating how different bandwidth transmissions generate out-of-band emissions.
Figure 2B:
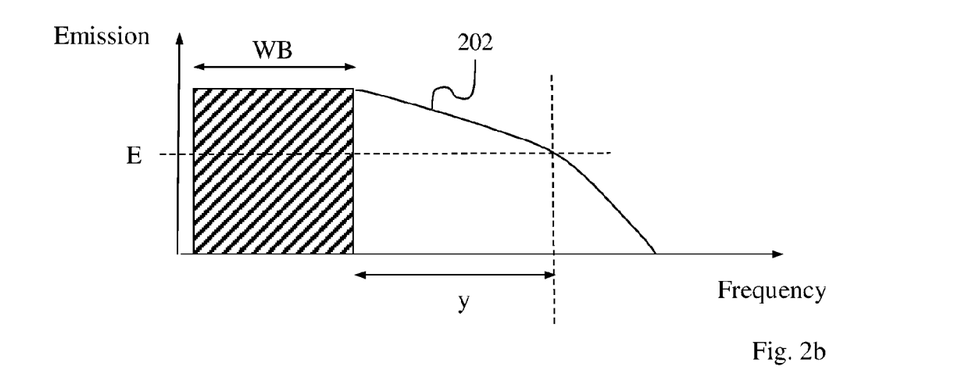

It is further recognized that the range in frequency of such unwanted emission becomes greater when the range of a used nominal band increases, which is illustrated in FIGS. 2a and 2b. In FIG. 2a, a nominal band of relatively narrow bandwidth "NB" is used by a transmitting user node e.g. when operating in an operating mode where a single carrier and/or a single antenna is used. The unwanted emission is partly illustrated on frequencies above the nominal band of NB, by the curve 200. The unwanted emission in this case exceeds a certain emission level "E" over a certain frequency range denoted "x". The same applies for frequencies below the nominal band of NB, not shown. The emission level E may be deemed critical in the sense that it may potentially cause interference to another node in an adjacent victim band.

In FIG. 2b, a nominal band of relatively wide bandwidth "WB" is used by the user node e.g. when operating in another operating mode where a multiple carrier and/or a multiple antennas are used. The unwanted emission 202 on frequencies above the nominal band of WB in this case exceeds the critical emission level E over a frequency range "y" that is considerably greater than x in FIG. 2a. The same applies for frequencies below the nominal band of WB, not shown. It is thus recognized that the risk for interference in an adjacent victim band is greater when the user node is operating on the wide bandwidth WB in the second operating mode than when operating on the narrow bandwidth NB in the first operating mode.

Consequently, the user node must be instructed to transmit with lower power when operating on WB in the second operating mode, as compared to the first operating mode, in order to reduce the frequency range y that exceeds the critical emission level E and thus avoid or at least alleviate the potential interference the transmission might cause on an adjacent victim band. On the other hand, the user node should be preferably allowed to transmit with the higher power again when returning to operate on NB in the first operating mode, e.g. to achieve adequate reception of the transmitted signals. As mentioned above, some disadvantages occur when the network node is required to issue a new power regulation order each time the user node changes its operation mode, which may happen quite frequently, including excessive signaling over the radio interface and the extra time it takes for the user node to adopt each new required power level. Embodiments of the solution to be described below can be used to avoid the need for sending a new power regulation order each time the user node changes its operation mode, as follows.

When the user node is expected or anticipated to switch between the first and second operation modes, e.g. at least once, the network node in this solution signals to the user node two different values of a maximum allowed transmit power to be applied by the user node depending on which operating mode it operates in. Thereby, the user node is able to adapt its transmission power level on its own according to the signaled values when switching between operation modes, without requiring any additional power regulation orders from the network node. An example of how this may be done will now be described with reference to the flow chart in FIG. 3 which illustrates actions performed by a network node which is arranged to control power of uplink transmissions from a user node capable of transmitting radio signals in a first operating mode and in a second operating mode.

Figure 3:
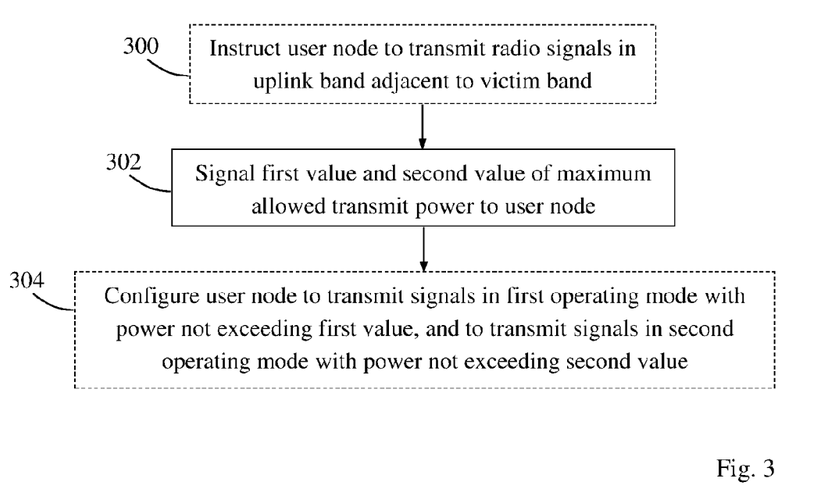
FIG. 3 is a flow chart illustrating a procedure that may be performed by a network node, according to some possible embodiments.

The network node in this procedure may be implemented in a radio network controlling node such as the well-known Radio Network Controller RNC, or in a base station, depending on how the network is configured, although the solution is not limited to these examples. If the network node is implemented in an RNC or similar, any signaling and messages therefrom are actually transmitted by an associated base station currently serving the user node which base station also receives any radio signals transmitted by the user node.

An optional first action 300 illustrates schematically that the network node may instruct the user node to transmit radio signals, e.g. with data and/or control signaling, in an uplink band that is adjacent to another band that may potentially be interfered by the user node's transmitted radio signals, hence a victim band. In another action 302, the network node signals to the user node a first value of a maximum allowed transmit power to be applied by the user node when operating in the first operating mode and a second value of the maximum allowed transmit power to be applied by the user node when operating in the second operating mode. Thereby, the user node is effectively required to use a transmit power not exceeding the first value when transmitting radio signals in the first operating mode, and to use a transmit power not exceeding the second value when transmitting radio signals in the second operating mode. This action does not exclude that the network node may signal more than two values of the maximum allowed transmit power to the user node, e.g. also a third value and so forth, which are to be applied by the user node when operating in further operating modes such as a third operating mode and so forth.

A further optional action 304 illustrates that the network node itself may actually configure the user node to transmit signals in the first operating mode with a power not exceeding the signaled first value, and to transmit signals in the second operating mode with a power not exceeding the signaled second value. This action may alternatively be performed by the serving base station if the network node is implemented in an RNC or similar. In practice, and depending on the implementation, the above actions 300-304 may be performed by triggering the serving base station to transmit one or more suitable control messages containing at least the first and second values of the maximum allowed transmit power to the user node. Such control messages may also contain an indication of any uplink radio resources allocated to the user node for the transmission of radio signals, e.g. with data and/or control signaling, according to regular procedures.

The above procedure may be performed in accordance with various possible optional embodiments. In some possible embodiments, the network node may be configured to signal the first and second values by broadcasting system information or by sending a dedicated message to the user node. An advantage with using dedicated messages to different user nodes is that different values of the second value can be sent to different user nodes. This may for example depend on the minimum distance between the uplink carriers used by the user nodes and the frequency range that needs to be protected, i.e. the victim band, since the amount of required power reduction may vary between different user nodes, e.g. depending on if the secondary carrier occupies a frequency range that is lower or higher than the primary carrier. It is also possible to update already signaled values of the maximum allowed transmit power by signaling to the user node. For example, it may be desirable to apply and signal one or more new values to the user node if it has moved to another geographic area and/or cell, if the traffic load has changed, if the need to protect the victim band has changed, depending on time of day or week, and so forth.

In further possible embodiments, the network node may be configured to signal the first and second values as follows. For example in UTRA (UMTS Terrestrial Radio Access), it is specified that an uplink power limitation denoted "Maximum allowed UL TX power" can be indicated by the network in the broadcasted System Information Block type 3 or in the broadcasted System Information Block type 4, and in other dedicated messages transmitted to the user node. The first value may be signaled as an existing channel information element as defined in the 3GPP document TS 25.331 as:

MaxAllowedUL-TX-Power::=INTEGER (−50 . . . 33)

In this case, the second value may be signaled as a new channel information element which could be further defined in TS 25.331 as:

AdditionalMaxAllowedUL-TX-Power::=INTEGER (−50 . . . 33)

This new channel information element may be likewise indicated in the broadcasted System Information Block type 3 or in the broadcasted System Information Block type 4, and in other dedicated messages transmitted to the user node.

In another possible embodiment, the first operating mode may comprise single carrier transmission and the second operating mode may comprise multiple carrier transmission, which was also mentioned above. For example, the above-mentioned "Maximum allowed UL TX power" may apply when single-carrier transmission is used while the "Additional maximum allowed UL TX power" may apply when dual-carrier transmission is used. In another possible embodiment, when multiple carriers are used in the second operating mode, the user node may be required to use a total transmit power not exceeding the second value for all carriers used in the second operating mode, to ensure that the total transmission on the multiple carriers is limited to avoid or at least reduce any harmful interference the transmission might cause on an adjacent victim band.

Different definitions may be employed for when a user node is considered to operate in a first or a second operating mode, and for when the associated maximum allowed transmit power should be applied. Again using single or multiple carrier operation as a non-limiting example, a user node may be considered to operate in a second operating mode as soon as the network has configured the user node to use multiple carrier operation, which may be done by signaling from an RNC of a UMTS network. In this case, the network signals to the user node what frequency to use for each secondary carrier and other information necessary to communicate with the network on this secondary carrier. Alternatively, a user node may be considered to operate in a second operating mode as soon as the network has activated the secondary carrier for the user node, which may be done by signaling from a serving base station. Another alternative is that a user node may be considered to operate in a second operating mode as soon as the network, e.g. the serving base station, has sent a non-zero scheduling grant for the secondary carrier to the user node. As yet another alternative, a user node may be considered to operate in a second operating mode only during time instants when it is actually transmitting signals on both the primary and the secondary carrier.

It is also possible to restrict the transmission power depending on how many carriers are used in the second operating mode while the second value should be applied for exactly two carriers. Thus, in another possible embodiment, the network node may be configured to instruct the user node to reduce the second value by a "carrier-specific offset" for each additional carrier more than two carriers. For example, it may be appropriate to reduce the second value by a specific carrier-specific offset CSO, e.g. 1 dB, such that the signaled second value is reduced by $(N-2) \times CSO$ when N carriers are used and $N>2$.

Figure 4:
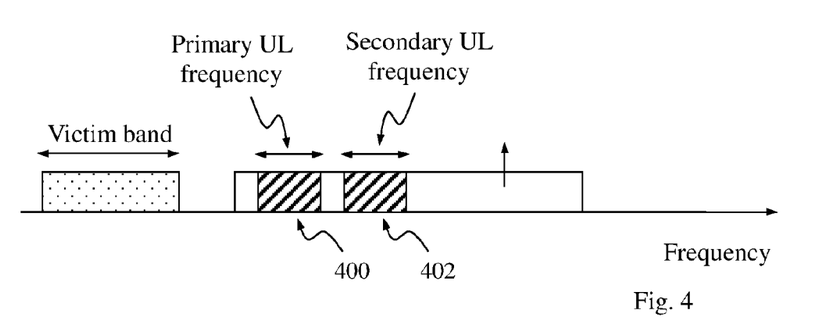
FIG. 4 is a diagram illustrating an example of how uplink transmissions may be distributed for two carriers.
Figure 5:
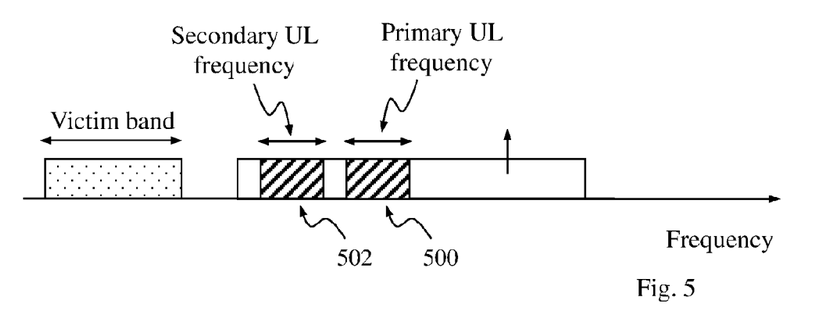
FIG. 5 is a diagram illustrating another example of how uplink transmissions may be distributed for two carriers.

In another possible embodiment, when multiple carriers are used in the second operating mode, the single carrier transmission may be applied in the first operating mode on a primary uplink frequency and the multiple carrier transmission may be applied in the second operating mode on a primary uplink frequency and at least one secondary uplink frequency. Some examples of this are illustrated in FIGS. 4 and 5. In FIG. 4, a first carrier frequency 400 is used as the primary uplink (UL) frequency and a second carrier frequency 402 is used as the secondary uplink frequency such that the first carrier frequency 400 is closest to a victim band. When both carrier frequencies 400 and 402 are used in the second operating mode, i.e. two carriers over a relatively wide band, more unwanted out-of-band emissions will be generated as compared to when only carrier frequency 400 is used in the first operating mode, i.e. a single carrier over a relatively narrow band.

In FIG. 5, on the other hand, a first carrier frequency 500 is used as the primary uplink frequency and a second carrier frequency 502 is used as the secondary uplink frequency such that the second carrier frequency 502 is closest to a victim band. Similar to FIG. 4, when both carrier frequencies 500 and 502 are used in the second operating mode, i.e. two carriers, more unwanted out-of-band emissions will be generated as compared to when only carrier frequency 500 is used in the first operating mode, i.e. a single carrier. In this case however, transmissions only in the first carrier frequency 500 in FIG. 5 will cause less interference in the victim band than the first carrier frequency 400 in FIG. 4 since carrier frequency 400 is closer to the victim band than the first carrier frequency 500 in FIG. 5. Therefore, when using only the primary uplink frequency in the first operating mode, a higher maximum power may potentially be allowed in the configuration of FIG. 5 than in the configuration of FIG. 4.

When the secondary uplink frequency is activated, the power limitation indicated in the second value, e.g. the channel information element "Additional maximum allowed UL TX power", applies to the sum of the output power of the primary uplink frequency and the secondary uplink frequency. When the secondary uplink frequency is deactivated, the power limitation indicated in the first value, e.g. the channel information element "Maximum allowed UL TX power", applies to the output power of the primary uplink frequency. Further, in a future release of the standard, it may be allowed to use more than one secondary uplink frequency simultaneously. In one such embodiment, the power limitation indicated in the second value, e.g. the channel information element "Additional maximum allowed UL TX power", applies to the sum of the output power of all currently activated carriers.

It was mentioned above that different features in the user node may generate different amounts of out-of-band emissions. In yet another possible embodiment, the network node may, by suitable signaling, be configured to instruct the user node to adjust the second value by a "feature-specific offset" when at least one feature is activated in the user node. The at least one feature may pertain to any of:

A used modulation scheme, recognizing that different modulation schemes may generate different amounts of unwanted emissions outside the nominal band.

A used antenna configuration, recognizing that different antenna configurations may generate different amounts of unwanted emissions outside the nominal band.

Usage of uplink MIMO, recognizing that MIMO may generate a different amount of unwanted emissions outside the nominal band as compared to when MIMO is not employed.

Usage of uplink transmit diversity, recognizing that uplink transmit diversity may generate a different amount of unwanted emissions outside the nominal band as compared to when uplink transmit diversity is not employed.

The use of a configured output power may thus depend on features described by various radio parameters, e.g. as exemplified above. Some non-limiting examples of this could thus include the use of higher-order modulation, e.g. 16QAM/4PAM for High Speed Uplink Packet Access, HSUPA, and the use of different antenna configurations and transmission modes, e.g. uplink MIMO or uplink transmit diversity. Furthermore, the second value, e.g. the channel information element "Additional maximum allowed UL TX power" may be applied depending on different combinations of one or more different radio parameters, e.g. the use of 16QAM and an activated secondary uplink frequency. Since this allows for many different combinations, more than one new signaled value may be required, which can be accomplished in several ways. As non-limiting examples, some different values of a maximum allowed transmit power to be applied for different combinations may be defined using new physical channel information elements as follows:

MaxAllowedUL-TX-Power-DualCarrier::=INTEGER (−50 . . . 33)
MaxAllowedUL-TX-Power-16QAM::=INTEGER (−50 . . . 33)
MaxAllowedUL-TX-Power-MIMO::=INTEGER (−50 . . . 33)
MaxAllowedUL-TX-Power-DualCarrier-16QAM::=INTEGER (−50 . . . 33)

Further, it is possible to define information elements as the above second value and further values of the maximum allowed transmit power that would apply a certain offset or the like related to the first value of the maximum allowed transmit power e.g. depending on what features are active. In yet another possible embodiment, the network node may thus be configured to signal the second value as a modification of the first value, e.g. in the form of an offset or the like. Thus, the second value may be signaled as a specific reduction of the first value, e.g. 5 dB implying that the second value equals the first value minus 5 dB.

An example of how the user node of the above examples may operate will now be described with reference to the flow chart in FIG. 6 which illustrates actions performed by a user node which is arranged to perform uplink transmissions as controlled by a network node of a radio network. It is assumed that the user node is capable of transmitting radio signals in a first operating mode and in a second operating mode. The network node in this procedure may be the network node described above for FIG. 3. An optional first action 600 illustrates schematically that the user node may receive an instruction from the network node to transmit radio signals, e.g. with data and/or control signaling, in an uplink band that is adjacent to another band that may potentially be interfered by the user node's transmitted radio signals, hence a victim band. This action basically corresponds to action 300 in FIG. 3.

In another action 602, the user node receives from the network node a first value of a maximum allowed transmit power to be used when operating in the first operating mode and a second value of the maximum allowed transmit power to be used when operating in the second operating mode. This action basically corresponds to action 302 in FIG. 3 where the network node signals the first and second values to the user node, either by broadcasting or by sending a dedicated message to the user node.

If the user node determines in an action 604 to operate in the first operating mode, the user node uses a transmit power not exceeding the first value when transmitting radio signals in the first operating mode, as shown by an action 606. On the other hand, if the user node determines in action 604 to operate in the second operating mode, the user node uses a transmit power not exceeding the second value when transmitting radio signals in the second operating mode, as shown by an action 608. In either case, the user node may at some point change its operating mode in an action 610 such that the procedure returns to action 604 to determine operating mode and use a transmit power accordingly, and so forth. Thereby, the user node only needs to receive the first and second values of the maximum allowed transmit power once, and no further power regulation orders are needed which thus saves further resource consuming and time consuming signaling from the network to the user node.

Figure 6:
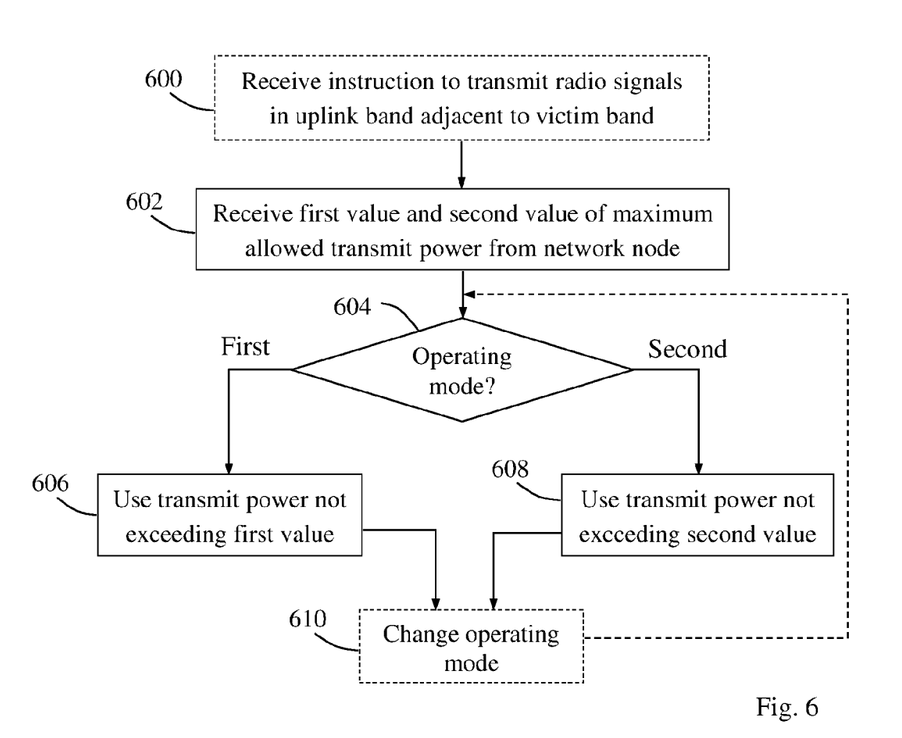
FIG. 6 is another flow chart illustrating a procedure that may be performed by a user node, according to further possible embodiments.

The embodiments described above are also applicable in this procedure of FIG. 6. Thus, the first operating mode may comprise single carrier transmission and the second operating mode may comprise multiple carrier transmission. In that case, the user node may be configured to use a total transmit power not exceeding the second value for all carriers used in the second operating mode. The user node may further be configured to be instructed by the network node to reduce the second value by a carrier-specific offset for each additional carrier more than two carriers. The user node may further be configured to apply the single carrier transmission in the first operating mode on a primary uplink frequency and to apply the multiple carrier transmission in the second operating mode on a primary uplink frequency and at least one secondary uplink frequency. The first operating mode may also comprise single antenna transmission and the second operating mode may comprise multiple antenna transmission.

In further embodiments, the user node may be configured to receive the first and second values from the network node as broadcasted system information or as a dedicated message to the user node. The user node may further be configured to receive the first value as an existing channel information element (MaxAllowedUL-TX-Power) and to receive the second value as a new channel information element (AdditionalMaxAllowedUL-TX-Power).

The user node may further be configured to be instructed by the network node to adjust the second value by a feature-specific offset when at least one feature is activated in the user node, the at least one feature pertaining to any of:
modulation scheme,
antenna configuration,
usage of uplink Multiple-Input-Multiple-Output, MIMO, and
usage of uplink transmit diversity.

The user node may further be configured to receive the second value as a modification of the first value.

Figure 7:
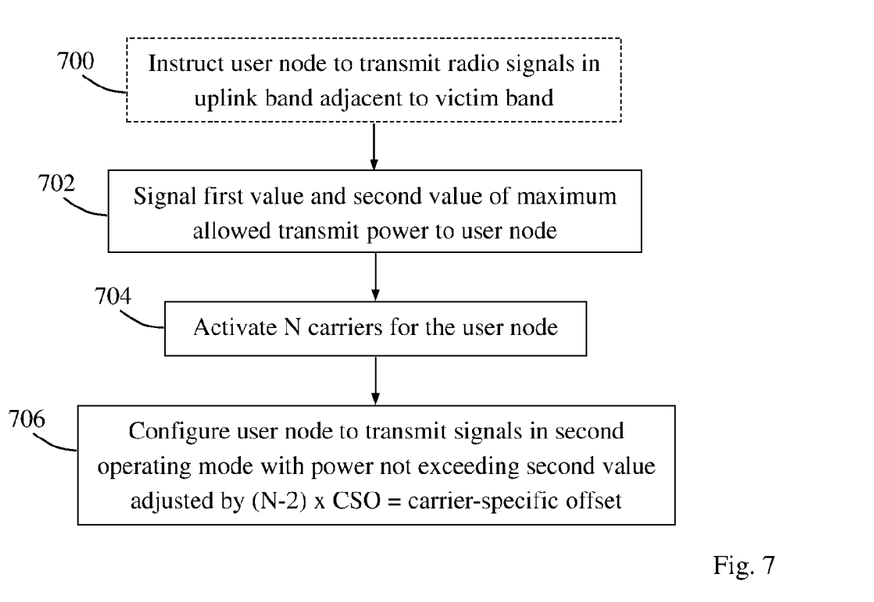
FIG. 7 is another flow chart illustrating a procedure that may be performed by a network node, according to further possible embodiments.

Another procedure performed by the above network node according to some of the above embodiments will now be described with reference to the flow chart in FIG. 7. An optional first action 700 illustrates that the network node may instruct the user node to transmit radio signals in an uplink band that is adjacent to a victim band, as in action 300. Another action 702 illustrates that the network node signals to the user node the above-described first and second values of a maximum allowed transmit power, as in action 302. Actions 700 and 702 are thus basically the same as actions 300 and 302.

In this example, multiple carriers are used by the user node, the number of carriers being denoted N. Another action 704 thus illustrates that N carriers are activated for the user node. In a further action 706, the network node configures the user node to specifically transmit radio signals in the second operating mode with a power not exceeding the second value adjusted by (N−2)×CSO, where CSO is a predefined carrier-specific offset value. Effectively, the user node will adjust the received second value by one CSO value for each added carrier more than two. Thereby, the user node is able to change the number of carriers used and adjust its maximum power accordingly, without requiring any further signaling from the network node, such that an optimal maximum allowed transmit power will be applied when using any number of carriers.

Figure 8:
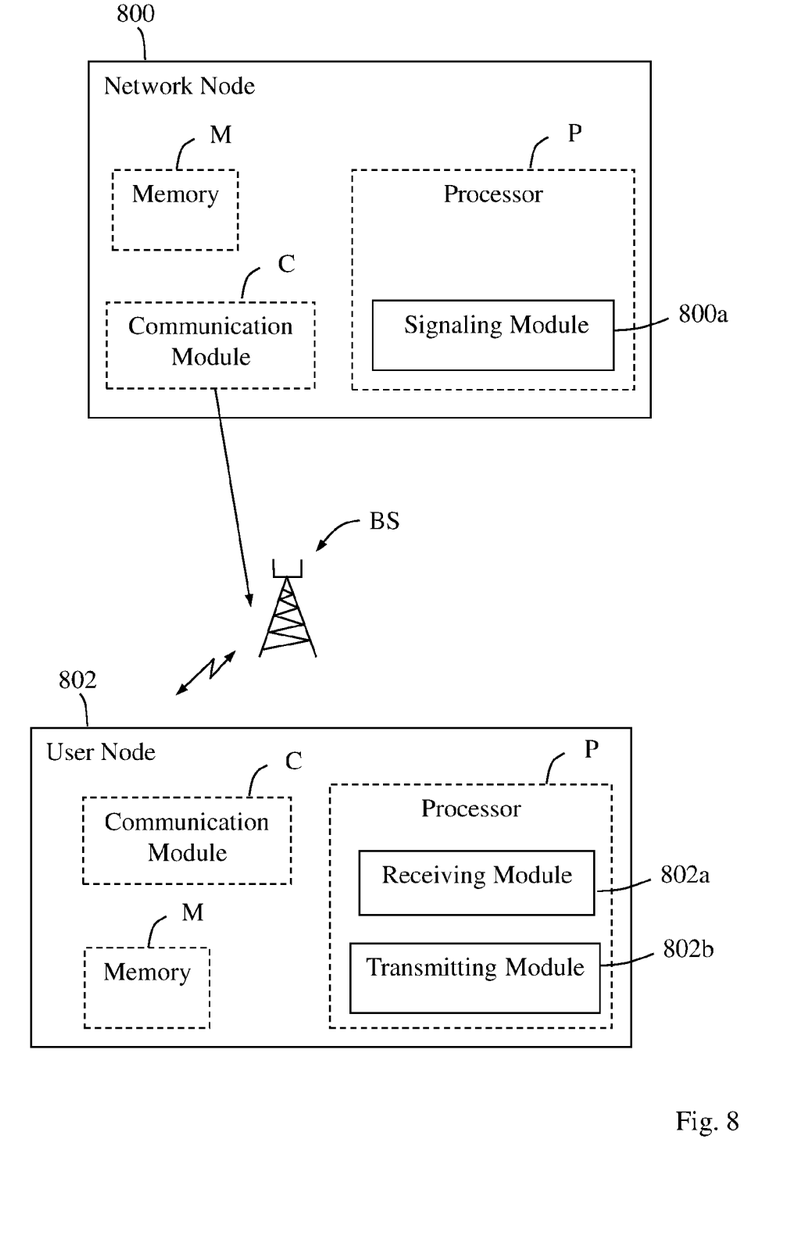
FIG. 8 is a block diagram illustrating a user node and a network node in more detail, according to further possible embodiments.

The block diagram in FIG. 8 illustrates a detailed but non-limiting example of how a network node 800 and a user node 802, respectively, may be structured to bring about the above-described solution and embodiments thereof. In this figure, the network node 800 and the user node 802 may be configured to operate according to any of the examples and embodiments of employing the solution as described above, where appropriate, and as follows. Each of the network node 800 and the user node 802 is shown to comprise a processor "P", a memory "M" and a communication module "C" with suitable equipment for transmitting and receiving signals with information in the manner described herein.

The communication module C in the user node 802 comprises suitable radio circuitry configured for radio communication with a base station BS serving the user node 802 while the communication module C in the network node 800 of this example is configured for communication with the base station BS. Alternatively, the network node 800 may be implemented in the serving base station BS and in that case the communication module C in the network node 800 comprises radio circuitry configured for radio communication with user nodes such as the user node 802.

The network node 800 comprises means configured or arranged to perform at least the actions 302-304 of the flow chart in FIG. 3 in the manner described above. These actions may be performed by means of a module in the processor P in the network node 800 as follows. The network node 800 is arranged to control power of uplink transmissions from the user node 802 capable of transmitting radio signals in a first operating mode and in a second operating mode.

The network node 800 comprises a signaling module 800a which is configured to signal to the user node a first value of a maximum allowed transmit power to be applied by the user node when operating in the first operating mode and a second value of the maximum allowed transmit power to be applied by the user node when operating in the second operating mode. Thereby, the user node is required to use a transmit power not exceeding the first value when transmitting radio signals in the first operating mode, and to use a transmit power not exceeding the second value when transmitting radio signals in the second operating mode.

The user node 802 comprises means configured or arranged to perform at least the actions 602-608 of the flow chart in FIG. 6 in the manner described above. These actions may be performed by means of different modules in the processor P in the user node 802 as follows. The user node 802 is arranged to perform uplink transmissions as controlled by the network node 800, the user node 802 being capable of transmitting radio signals in a first operating mode and in a second operating mode.

The user node 802 comprises a receiving module 802a which is configured to receive from the network node 800 a first value of a maximum allowed transmit power to be used when operating in the first operating mode and a second value of the maximum allowed transmit power to be used when operating in the second operating mode. The user node 802 also comprises a transmitting module 802b which is configured to use a transmit power not exceeding the first value when transmitting radio signals in the first operating mode, and to use a transmit power not exceeding the second value when transmitting radio signals in the second operating mode.

It should be noted that FIG. 8 illustrates various functional modules in the network node 800 and the user node 802, respectively, and the skilled person is able to implement these functional modules in practice using suitable software and hardware. Thus, the solution is generally not limited to the shown structures of the network node 800 and the user node 802, and the functional modules 800a and 802a-b may be configured to operate according to any of the features described in this disclosure, where appropriate.

The functional modules 800a and 802a-b described above can be implemented in the network node 800 and the user node 802, respectively, by means of program modules of a respective computer program comprising code means which, when run by the processor P in each node causes the network node 800 and the user node 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 800 and the user node 802 in the form of a memory having a computer readable medium and being connected to the processor P. The computer program product or memory M in each of the network node 800 and the user node 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 800 and user node 802.

The solution described herein may be implemented by a computer program comprising instructions which, when executed on at least one processor, cause the at least one processor to carry out the actions according to any of the above embodiments. The solution may also be implemented in a carrier containing the above computer program, wherein the carrier is one of an electronic signal, optical signal, radio signal, or computer readable storage medium.

Advantages of the above-described solution and its embodiments include reduced signalling, low interference and efficient power regulation, as explained above. In particular, for uplink single- and multiple-carrier transmission, the possibility to indicate differentiated power limitations by the first and second values, respectively, means that the output power of the user node can be optimized for each transmission mode while still avoiding or reducing an unwanted emission level in an adjacent victim band. In prior procedures, both single- and multiple-carrier transmission are constrained by the same maximum allowed transmit power. If a more stringent limitation is needed for multiple-carrier transmission in order to meet an unwanted emission limit in an adjacent victim band, the prior procedures would also impact and reduce the uplink coverage when single-carrier transmission is configured which is not the case when using the embodiments described herein.

While the solution has been described with reference to specific exemplary embodiments, the description is generally only intended to illustrate the inventive concept and should not be taken as limiting the scope of the solution. For example, the terms "radio network", "user node", "network node", and "operating mode", have been used throughout this description, although any other corresponding entities, functions, and/or parameters could also be used having the features and characteristics described here. The solution is defined by the appended claims.

The invention claimed is:

1. A method performed by a network node of a radio network, for controlling power of uplink transmissions from a user node configured to switch between a first operating mode and a second operating mode when transmitting radio signals, the method comprising:
    signaling to the user node a first value of a maximum allowed transmit power to be applied by the user node when operating in the first operating mode using a nominal band of relatively narrow bandwidth, and a second value of the maximum allowed transmit power to be applied by the user node when operating in the second operating mode using a nominal band of relatively wide bandwidth;
    thereby requiring the user node to use a transmit power not exceeding the first value when transmitting radio signals in the first operating mode, and to use a transmit power not exceeding the second value when transmitting radio signals in the second operating mode such that the user node is instructed to transmit with lower power when operating in the second operating mode as compared to when operating in the first operating mode.

2. The method of claim 1, wherein the first operating mode comprises single carrier transmission and the second operating mode comprises multiple carrier transmission.

3. The method of claim 2, wherein the user node is required to use a total transmit power not exceeding the second value for all carriers used in the second operating mode.

4. The method of claim 2, wherein the network node instructs the user node to reduce the second value by a carrier-specific offset for each additional carrier more than two carriers.

5. The method of claim 2, wherein the single carrier transmission is applied in the first operating mode on a primary uplink frequency and the multiple carrier transmission is applied in the second operating mode on a primary uplink frequency and at least one secondary uplink frequency.

6. The method of claim 1, wherein the first operating mode comprises single antenna transmission and the second operating mode comprises multiple antenna transmission.

7. The method of claim 1, wherein the network node signals the first and second values by broadcasting system information or by sending a dedicated message to the user node.

8. The method of claim 1, wherein the network node signals the first value as an existing channel information element (MaxAllowedUL-TX-Power) and the second value as a new channel information element (AdditionalMaxAllowedUL-TX-Power).

9. The method of claim 1, wherein the network node instructs the user node to adjust the second value by a feature-specific offset when at least one feature is activated in the user node, the at least one feature pertaining to any of:
    modulation scheme;
    antenna configuration;
    uplink Multiple-Input-Multiple-Output (MIMO); and
    uplink transmit diversity.

10. The method of claim 1, wherein the network node signals the second value as a modification of the first value.

11. A non-transitory computer-readable medium comprising, stored thereupon, computer-executable instructions configured to cause a processor executing the computer-executable instructions to carry out the method of claim 1, when the computer-ex, when executed on at least one processor, cause the at least one processor to carry out the method of claim 1.

12. A network node of a radio network, the network node being arranged to control power of uplink transmissions from a user node capable of transmitting radio signals in a first operating mode and in a second operating mode, the network node comprising a processing circuit configured to:
    signal to the user node a first value of a maximum allowed transmit power to be applied by the user node when operating in the first operating mode using a nominal band of relatively narrow bandwidth and a second value of the maximum allowed transmit power to be applied by the user node when operating in the second operating mode using a nominal band of relatively wide bandwidth,
    thereby requiring the user node to use a transmit power not exceeding the first value when transmitting radio signals in the first operating mode, and to use a transmit power not exceeding the second value when transmitting radio signals in the second operating mode such that the user node is instructed to transmit with lower power when operating in the second operating mode as compared to when operating in the first operating mode.

13. The network node of claim 12, wherein the first operating mode comprises single carrier transmission and the second operating mode comprises multiple carrier transmission.

14. The network node of claim 13, wherein the user node is required to use a total transmit power not exceeding the second value for all carriers used in the second operating mode.

15. The network node of claim 13, wherein the processing circuit is further configured to instruct the user node to reduce the second value by a carrier-specific offset for each additional carrier more than two carriers.

16. The network node of claim 13, wherein the single carrier transmission is applied in the first operating mode on a primary uplink frequency and the multiple carrier transmission is applied in the second operating mode on a primary uplink frequency and at least one secondary uplink frequency.

17. The network node of claim 12, wherein the first operating mode comprises single antenna transmission and the second operating mode comprises multiple antenna transmission.

18. The network node of claim 12, wherein the processing circuit is further configured to signal the first and second values by broadcasting system information or by sending a dedicated message to the user node.

19. The network node of claim 12, wherein the processing circuit is further configured to signal the first value as an existing channel information element (MaxAllowedUL-TX-Power) and the second value as a new channel information element (AdditionalMaxAllowedUL-TX-Power).

20. The network node of claim 12, wherein the processing circuit is further configured to instruct the user node to adjust the second value by a feature-specific offset when at least one feature is activated in the user node, the at least one feature pertaining to any of:
modulation scheme;
antenna configuration;
uplink Multiple-Input-Multiple-Output (MIMO; and
uplink transmit diversity.

21. The network node of claim 12, wherein the processing circuit is further configured to signal the second value as a modification of the first value.

22. A method performed by a user node for performing uplink transmissions as controlled by a network node of a radio network, the user node being capable of transmitting radio signals in a first operating mode and in a second operating mode, the method comprising:
receiving from the network node a first value of a maximum allowed transmit power to be used when operating in the first operating mode using a nominal band of relatively narrow bandwidth and a second value of the maximum allowed transmit power to be used when operating in the second operating mode using a nominal band of relatively wide bandwidth;
using a transmit power not exceeding the first value when transmitting radio signals in the first operating mode; and
using a transmit power not exceeding the second value when transmitting radio signals in the second operating mode, wherein the user node transmits with lower power when operating in the second operating mode as compared to when operating in the first operating mode.

23. The method of claim 22, wherein the first operating mode comprises single carrier transmission and the second operating mode comprises multiple carrier transmission.

24. The method of claim 23, wherein the user node uses a total transmit power not exceeding the second value for all carriers used in the second operating mode.

25. The method of claim 23, wherein the user node is instructed by the network node to reduce the second value by a carrier-specific offset for each additional carrier more than two carriers.

26. The method of claim 22, wherein the single carrier transmission is applied in the first operating mode on a primary uplink frequency and the multiple carrier transmission is applied in the second operating mode on a primary uplink frequency and at least one secondary uplink frequency.

27. The method of claim 22, wherein the first operating mode comprises single antenna transmission and the second operating mode comprises multiple antenna transmission.

28. The method of claim 22, wherein the first and second values are received from the network node as broadcasted system information or as a dedicated message to the user node.

29. The method of claim 22, wherein the first value is received as an existing channel information element (MaxAllowedUL-TX-Power) and the second value is received as a new channel information element (AdditionalMaxAllowedUL-TX-Power).

30. The method of claim 22, wherein the user node is instructed by the network node to adjust the second value by a feature-specific offset when at least one feature is activated in the user node, the at least one feature pertaining to any of:
modulation scheme;
antenna configuration;
uplink Multiple-Input-Multiple-Output (MIMO); and
uplink transmit diversity.

31. The method of claim 22, wherein the second value is received as a modification of the first value.

32. A user node arranged to perform uplink transmissions as controlled by a network node of a radio network, the user node being capable of transmitting radio signals in a first operating mode and in a second operating mode, the user node comprising a processing circuit configured to:
receive from the network node a first value of a maximum allowed transmit power to be used when operating in the first operating mode using a nominal band of relatively narrow bandwidth and a second value of the maximum allowed transmit power to be used when operating in the second operating mode using a nominal band of relatively wide bandwidth;
use a transmit power not exceeding the first value when transmitting radio signals in the first operating mode; and
use a transmit power not exceeding the second value when transmitting radio signals in the second operating mode, wherein the user node is configured to transmit with lower power when operating in the second operating mode as compared to when operating in the first operating mode.

33. The user node of claim 32, wherein the first operating mode comprises single carrier transmission and the second operating mode comprises multiple carrier transmission.

34. The user node of claim 33, wherein the processing circuit is further configured to use a total transmit power not exceeding the second value for all carriers used in the second operating mode.

35. The user node of claim 33, wherein the processing circuit is further configured to be instructed by the network node to reduce the second value by a carrier-specific offset for each additional carrier more than two carriers.

36. The user node of claim 33, wherein the processing circuit is further configured to apply the single carrier transmission in the first operating mode on a primary uplink frequency and to apply the multiple carrier transmission in the second operating mode on a primary uplink frequency and at least one secondary uplink frequency.

37. The user node of claim 32, wherein the first operating mode comprises single antenna transmission and the second operating mode comprises multiple antenna transmission.

38. The user node of claim 32, wherein the processing circuit is further configured to receive the first and second values from the network node as broadcasted system information or as a dedicated message to the user node.

39. The user node of claim 32, wherein the processing circuit is further configured to receive the first value as an existing channel information element (MaxAllowedUL-TX-Power) and to receive the second value as a new channel information element (AdditionalMaxAllowedUL-TX-Power).

40. The user node of claim 32, wherein the processing circuit is further configured to be instructed by the network node to adjust the second value by a feature-specific offset when at least one feature is activated in the user node, the at least one feature pertaining to any of:
- modulation scheme;
- antenna configuration;
- uplink Multiple-Input-Multiple-Output (MIMO); and
- uplink transmit diversity.

41. The user node of claim 32, wherein the processing circuit is further configured to receive the second value as a modification of the first value.

\* \* \* \* \*